United States Patent [19]

Grabovac et al.

[11] Patent Number: 4,485,703

[45] Date of Patent: Dec. 4, 1984

[54] TORQUE WRENCH

[75] Inventors: Bosko Grabovac, Arcadia; Ivan Vuceta, Walnut, both of Calif.

[73] Assignee: Consolidated Devices, Inc., City of Industry, Calif.

[21] Appl. No.: 497,060

[22] Filed: May 20, 1983

[51] Int. Cl.$^{3}$ .............................................. B23B 23/14

[52] U.S. Cl. ...................................................... 81/483

[58] Field of Search ................. 81/483, 478, 480, 481, 81/482

[56] References Cited

U.S. PATENT DOCUMENTS 3,581,606 6/1971 Grabovac ............................ 81/483

3,772,942 11/1973 Grabovac ............................ 81/483

4,207,783 6/1980 Grabovac ............................ 81/483

*Primary Examiner*—James L. Jones, Jr.

*Attorney, Agent, or Firm*—Georges A. Maxwell

[57] ABSTRACT

A torque wrench comprising an elongate, straight tubular lever with open front and rear ends, a work-engaging head at the front end of the lever and having a lever arm projecting into and pivotally connected with the front end portion of the lever, an elongate crank projecting freely rearwardly into the lever, an elongate axially biased compression spring extending longitudinally in the lever rearward of the crank, cam means between the spring and the crank normally releasably holding the crank concentric in the lever and operating to allow the crank to pivot and strike a side of the lever when a predetermined set operating force is exerted between the head and the lever through and about the axis of the lever arm. The wrench next includes adjusting means to vary the bias on said spring to adjust the operating force. Said means includes a plug set in the lever rearward of the spring, an elongate screw is engaged through the plug. The front end of the screw engages the rear end of the spring. A manually engageable knob is connected with the rear end of the screw and is spaced rearward from the lever. Said knob has a forwardly projecting sleeve engaged about the rear portion of the lever and a forwardly opening annular recess at the rear end of the sleeve. Said sleeve has longitudinally circumferentially extending calibrations at its central portion. An elongate tubular hand grip is slidably engaged about the rear portion of the lever, about the sleeve and normally entered into said annular recess. The rear end of the grip defines a reference edge which cooperates with the calibrations on the sleeve when the grip is shifted axially forward to a stopped actuated position. Stop means stop rotation of the grip relative to the lever and stop forward movement of the grip relative to the lever at said actuated position. Indexing means releasably lock the knob in set rotative position relative to the grip when the grip is in its normal position.

16 Claims, 15 Drawing Figures

TORQUE WRENCH

This invention has to do with an adjustable torque wrench and is particularly concerned with a wrench having improved manually operable setting means.

BACKGROUND OF THE INVENTION

In the art of torque wrenches, there is that special class of wrench which includes means for indicating (to the operator of the wrench) when a set predetermined force is transmitted by the wrench onto a related piece of work. More particularly, the class of wrench noted above and with which the present invention is concerned is an adjustable click-type torque wrench which is such that when a predetermined set force is transmitted by it onto a piece of work, certain parts within the wrench move rapidly from a normal position to an actuated position in a manner so that a slight movement, impact and an audible click-like sound are transmitted through the wrench to signal the operator that a predetermined set force has been reached.

Ordinary torque wrenches of the specific class here concerned with include elongate, tubular lever arms with front and rear ends, hand grip means at the rear ends of the arms and work-engaging heads at the front ends of the arms. The heads have elongate cranks projecting rearwardly and freely into and through the forward portions of the lever arms. The forward portions of the cranks are pivotally mounted to the forward ends of the arms and have flat, rearwardly disposed seats at their rear ends. Within the lever arms, rearward of the cranks, are longitudinally shiftable blocks with flat, forwardly disposed seats. Cam blocks with flat front and rear faces are engaged with and between the seats on the cranks and blocks. Within the lever arms, rearward of the blocks, elongate, axially extending compression springs are arranged to engage the blocks and to normally yieldingly urge the blocks forwardly toward the cranks, with the cam faces in pressure engagement with the crank and block seats. Within the rear end portions of the lever arms and engageable at the exteriors thereof are manually operable setting means which engage the springs and are operable to compress and vary the amount of force exerted by the springs onto and through the noted blocks.

In operation of the above noted class of wrenches, when a sufficient actuating force is exerted between the lever arms and the heads, as by manually applied force on the lever arms (when the heads are in stop engagement with related pieces of work) the rear ends of the cranks pivot laterally in the lever arms and strike the inner adjacent sides of the arms to transmit audible clicking sounds. When the cranks swing laterally, the cam blocks turn or rock between their related seats. Such rocking of the cam blocks urges the slide blocks rearwardly against the resistance of the springs.

The flat, front and rear faces of the cam block have straight edges on planes parallel with the pivotal axis of the cranks. The seats with which said faces of the cam blocks are related have shoulders, against which the noted edges of the cam blocks stop and are pivotally supported.

The lateral extent of the cam faces and the axial or longitudinal extent of the cam blocks determine the stability of the cam blocks between their related seats. The dimensions of the cam blocks and their resulting stability in such wrenches is not subject to change or variation.

It will be apparent that the magnitude of the actuating force in wrenches of the character described above is determined by the length of the mechanical advantage afforded by the cranks, the stability of the cam blocks and the pressure exerted by the springs. By adjusting the pressure of the springs, the actuating forces can be varied and set (within limited ranges of forces) as desired.

In one notable and special adjustable click-type wrench, an elongate link with front and rear ends is arranged in the lever arm between the arm and the slide block. The front end of the link is pivotally connected with the rear end of the crank and the rear end of the link is formed with a rearwardly disposed seat with which the cam block is engaged. The link is pivotally supported in the lever arm, intermediate its ends, by a pivotal support ring engaged about the link and which has a spherical exterior surface pivotally slidably engaging the interior of the lever arm. The support ring is shiftable longitudinally of the link and can be set in desired position longitudinally thereof. The pivot link imparts mechanical advantage to the spring of the wrench, enabling the use of a rather light spring. By adjusting the longitudinal position of the support ring on the link, fine adjustment of the wrench for operating through several different ranges of forces, without changing the spring, is possible. When this wrench structure is operated, the crank and the rear end of the link strike the interior surface of the lever arm.

The above noted special adjustable click-type wrench is disclosed in U.S. Pat. No. 3,772,942, issued Nov. 20, 1973, and entitled "Adjustable Torque Wrench".

The manually operable setting means for click-type wrenches provided by the prior art characteristically include plugs within the rear end portions of the lever arms rearwardly of the springs therein. The plugs have threaded apertures through which elongate threaded bolts or screws are engaged. Cylindrical spacer and washer assemblies, slidably engaged in the lever arms, are arranged between the screws or bolts and their related springs. By advancing the screws forwardly and rearwardly in their related plugs, the extent to which the springs are biased axially and the force exerted thereby onto and through the cam blocks of the wrenches is adjusted to set the operating forces of the wrenches.

In addition to the above, and to adjust the wrenches to operate at predetermined forces, various manually engageable rotatable and axially shiftable parts, with calibrations and/or scales, are cooperatively related with the screws and the lever arms to facilitate rotation and axial adjustment of the screws to desired positions. The calibrations or scales are provided and function to translate the axial positioning of the screws and the degree to which the springs are biased thereby, into operating forces.

In most wrenches provided by the prior art, the elongate tubular metal lever arms are formed with various splines, grooves, channels and openings which must be established therein by various costly to perform machining operations. Further, the lever arms of such wrenches, after all necessary machining and forming operations are performed thereon, must be heat treated or case-hardened to, for example, 61 Rockwell (inside and outside) to make them sufficiently strong and durable for their intended use. Still further, after machining and heat treating the lever arms, it is customary and necessary to clean all surfaces of the arms and to electroplate all of the exposed surfaces thereof with bright chrome or the like, to protect those surfaces and to make the wrenches marketable. (To the best of my knowledge and belief, all distributors and purchasers of torque wrenches of the class here concerned with require that the lever arms be clean, bright and protected with chrome-plate).

In practice, in torque wrenches of the general class here concerned with, the noted internally threaded plugs set within the lever arms, which plugs serve to carry the screws of the wrench adjusting or setting means, are set within the arms by staking or otherwise forming the walls of the arms radially inwardly into tight locking engagement in grooves or the like, formed in the exteriors of the plugs. Accordingly, the plugs must and are commonly set within the arms of the wrenches prior to heat treatment and chrome plating thereof. While the foregoing appears to be a good and straightforward manufacturing procedure, it has been found to have created several serious problems which have not been satisfactorily corrected or overcome by any one of numerous costly procedures which have been practiced in efforts to solve or correct those problems.

One notable serious problem is the tendency for the arms to be soft and/or weak at and adjacent to the plugs therein and to warp or otherwise distort during heat treatment. The existence of soft or weak portions in the arms and distortion thereof is brought about by the fact that the presence of the plugs in the arms, which plugs are of substantial mass and mask off their adjacent inside surfaces of the arms, prevent proper quenching of the masked portions of the arms, and, as heat storing elements, result in slowed and uneven quenching and coating of the portions of the arms adjacent thereto, during heat treatment thereof. As a result of the foregoing, the interior surfaces of the arms adjacent the plugs are not case-hardened during heat treatment and the hardening of the exterior surfaces at and near the plugs is generally less than and varies notably from the remaining portions of the arms.

Other serious problems are brought about by the fact that the interior surfaces of the lever arms of such wrenches tend to be covered and ladened with scale and rust which adversely interferes with the free sliding and/or pivotal movement of the several elements and/or parts of the wrench structures which occur within and contact the interior surfaces of the arms and/or the operation of which is subject to being adversely interfered with by loose scale, rust and other contaminants which come into contact therewith.

The scale and rust on the interior surface of the lever arms of such wrenches results from the fact that in the course of chrome plating the lever arms, uniform and satisfactory plating of the interior surfaces thereof cannot be effected. This is due in part to the collecting and trapping of gases in the arms, during plating. The trapping of gases is caused by the plugs which are set or fixed within the arms prior to plating the arms. Further, during the plating process, the arms are subject to acid baths to prepare the surfaces for plating. Before plating is commenced, the surfaces of the arms are rinsed in efforts to remove residual acid. In practice, it has been found that in spite of special efforts to rinse acid from within the lever arms, residual acid is retained by the scale and/or rust on those surfaces and is retained in the spaces between the arms and the plugs set therein. After the wrenches are finished, the residual acid attacks the materials of the arms and plugs and has been found to attack and react on all of the other elements and parts of the wrench within the arms, to do irreparable damage thereto.

The most satisfactoty way in which to reduce the adverse effect caused by residual acid within the lever arms of such wrenches has been to hone the interior surfaces thereof susequent to plating them. Such a procedure, in addition to being extremely costly, has not been fully effective since it has not effectively reached the spaces between the arms and their related plugs in which acid is commonly trapped and from which the acid eventually weeps.

In addition to the foregoing, in the noted common manufacturing procedures, where the internally threaded plugs are set in the lever arms at the time that the arms are plated, undesirable chrome is deposited in the threads of the plug and the threads must be suitably chased after the plating operation. This is but one more operation that must be performed and which adds to the cost of such wrenches.

While the above noted problem of being unable to establish and maintain the interiors of the lever arms of torque wrenches free of scale and rust might appear to be of secondary or minor significance, it is in fact a matter of great significance since those procedures which are practiced to reduce, but which fail to solve the problem, notably increase the cost of manufacture of the wrenches.

In accordance with the foregoing, it will be readily apparent that the cost of an adjustable click-type torque wrench can be materially reduced by eliminating any one or more machining and/or finishing operations that must be performed on the tubular metal lever arms thereof and that the effectivness, durability and therefore, the very utility of such wrenches can be notably enhanced and assured by a wrench structure which allows for quick, easy and economical cleaning and finishing of the interiors of the lever arms in the course of their manufacture.

OBJECTS AND FEATURES OF MY INVENTION

It is an object and feature of the invention to provide an improved adjustable click-type torque wrench, including an elongate, tubular metal lever arm with open front and rear ends and substantially straight continuous, uninterrupted cylindrical inside and outside surfaces, whereby the arm does not require any costly machining operations to be performed thereon; is such that it can be easily, economically and uniformly heat treated; and is such that it can be easily, effectively and economically chrome plated and cleaned so that its interior surfaces are and tend to remain free of scale, rust, and other contaminants which might adversely affect operation of the finished wrench.

Another object and feature of the invention is to provide an adjustable click-type torque wrench of the character referred to including novel manually operable force setting means at the rear end portion of the lever arm to vary the bias on an elongate compression spring within the lever arm and which includes an internally threaded plug removably set within the lever arm, an axially shiftable adjusting screw carried by the plug and having an outer end related to the inner end of the spring and an inner end projecting from the inner end of the arm, a manually engageable knob structure on the inner end of the screw and having a calibrated sleeve projecting axially outwardly therefrom and slidably engaged about the exterior of the arm and an elongate tubular hand grip engaged about the exterior of the arm and pinned thereto against rotation and slidable axially relative thereto from a normal inner or rear position where it stops at the knob and surrounds said sleeve to a forward position where the sleeve is exposed and where its rear end is stopped in predetermined position longitudinally of the lever arm and establishes a reference line for cailbrations on the sleeve.

It is another object and feature of the invention to provide a wrench structure of the general character referred to above wherein pins are provided to secure the plug in the lever arm, which pins project from the arm into guideways in the hand grip to prevent relative rotation of the grip relative to the arm and to allow axial shifting of the grip between its normal and actuated positions.

The foregoing and other objects and features of the invention will be apparent and will be fully understood from the following detailed description of the invention, throughout which description reference is made to the accompanying drawings.

DETAILED DESCRIPTION OF THE INVENTION

Figures 1, 2, 3, 4:
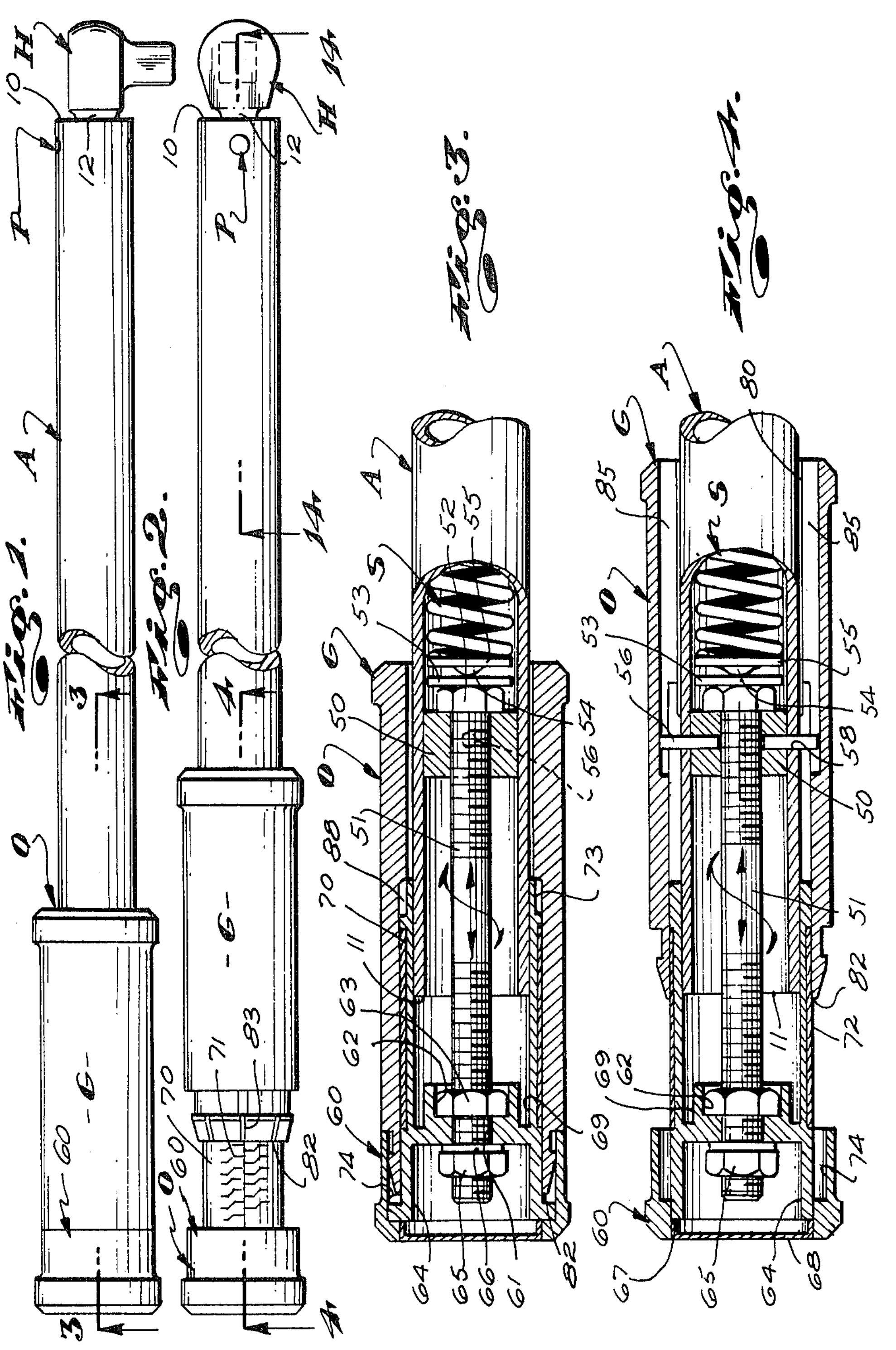
FIG. 1 is a side view of the wrench with its hand grip in its normal position.
FIG. 2 is a top view of the wrench with its hand grip in its actuated position.
FIG. 3 is an enlarged detailed sectional view taken as indicated by line 3—3 in FIG. 1.
FIG. 4 is a view similar to FIG. 3 with parts in another position.

It is to be understood that the drawings here provided and referred to in the following are for the purpose of illustrating the basic structure provided and that certain liberties have been exercised in the proportion of parts for the purpose of better illustrating the invention.

The wrench here provided includes an elongate, cylindrical, tubular lever A with front and rear ends 10 and 11, a work-engaging head H adjacent the forward end of the lever A and having a rearwardly projecting lever arm 12 of limited longitudinal extent projecting into the lever arm A, a crank pin P pivotally connecting the lever arm 12 in and to the front portion of the lever arm A. (For the purpose of this disclosure, the lever arm will be described as being disposed and extending horizontally and the axis of the crank pin being on a vertical axis intersecting the central horizontal longitudinal axis of the lever A). The wrench next includes an elongate crank C formed integrally with the lever arm 12, projecting rearwardly in the lever A, from the pin P. The crank normally projects freely and through the lever A, concentric with the axis thereof and has an enlarged rear end portion 15.

The rear end of the lever arm 12 and front end of the crank C are shown joined together by a spherical enlargement 17 with an opening 18, through which the pin P extends. The opposite ends of the pin P are engaged and held in openings 19 established in the front end portion of the lever A, as clearly shown in FIG. 14 of the drawings. The head H can be of any desired form and/or style and is shown as a block-like member formed integrally on the forward end portion of the lever arm 12 and which has a polygonal work-engaging portion 20 depending therefrom on a vertical axis, normally intersecting the central longitudinal axis of the lever A.

The enlarged rear end 15 of the crank is formed to define a flat, rearwardly disposed front seat F. The seat F is an element of a cam means M which will hereinafter be described. The seat F is defined by a vertically extending channel in the rear end of the crank C and has laterally spaced, laterally inwardly and rearwardly disposed, vertical shoulders. The shoulders are on axes parallel with and spaced from the pivotal axis of the crank and are spaced a predetermined distance laterally from the central longitudinal axis of the crank.

The wrench next includes a cylinder slide block B with flat front and rear ends 35 and 36 slidably engaged in the opening or bore of the lever A, in spaced relationship from the seat F on the crank C. The front end 35 of the block, forwardly disposes rear seat R which seat opposes the front seat F on the crank C. The seat R is similar to the seat F and, like the seat F, is characterized by laterally spaced, vertical shoulders which are disposed forwardly and laterally inwardly.

Next included in the wrench is a cubicle cam block E engaged between the seats F and R. The block E has front and rear faces normally establishing flat bearing engagement with the seats. The block E has opposite vertical sides which join the front and rear faces to define vertical edges which establish pivotal engagement in the vertical corners established by the seats and their related shoulders. The seats F and R and the block E related thereto establish the previously referred to cam means M.

With the construction thus far described, it will be apparent that when the slide block B is urged forwardly and axial pressure is exerted upon the cam block E, the faces thereof establish and are maintained in stable, flat bearing engagement with their opposing seats F and R.

Figure 14:
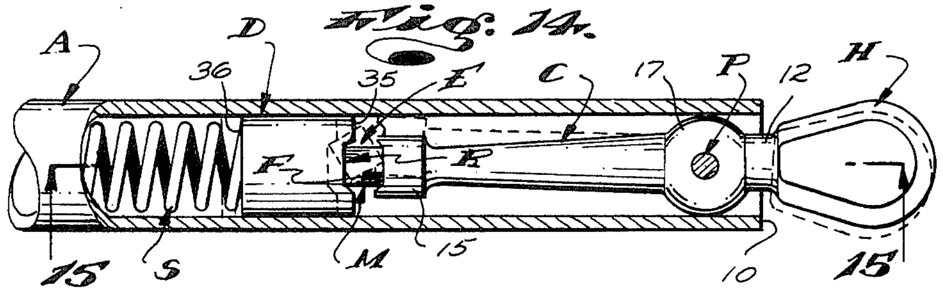
FIG. 14 is a sectional view taken as indicated by line 14—14 in FIG. 1.
Figure 15:
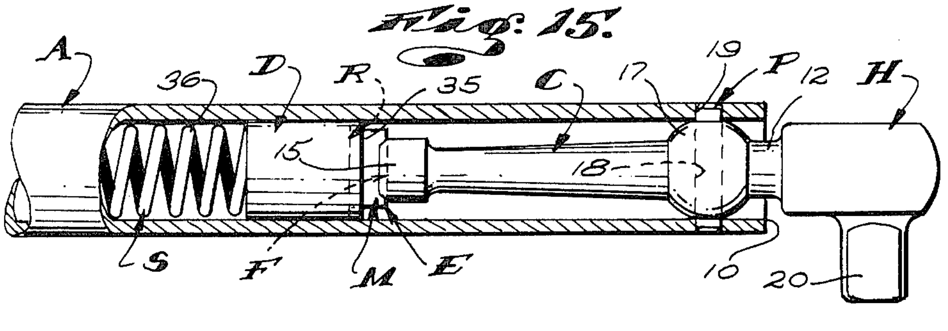
FIG. 15 is a view taken as indicated by line 15—15 in FIG. 14.

It will be further noted and apparent that when the rear end of the crank C is urged and caused to move laterally in the lever A, about its pivotal axis, by the application of forces on and through the head H and lever arm 12, the cam block E is caused to turn or rock out of seated engagement with the seats F and R, in the manner illustrated in dotted lines in FIG. 14 of the drawings. When the cam means is caused to shift from its normal position to its actuated position, as described above, the vertical edges or corners of the cam block E pivotally seat and bear in the corners established by seats F and R and their related shoulders.

When the structure is actuated, as set forth above, the rear end of the crank C strikes and is stopped by the inside surface of the lever A, before the cam block E is rotated over center and so that when the forces which cause the rear of the crank to move laterally are released, any slight forwardly applied force on the slide block B will urge the cam block E back to its normal position. Such movement of the block E back to its normal position will also urge the crank C and the head H thereon back to their normal positions.

When the construction is urged from its normal to its actuated position, as set forth above, and as the cam block E is caused to rock or turn, the slide block B is urged and caused to move rearwardly in the lever A, against a forwardly directed force applied thereto.

The present invention next includes spring means S in the lever A, rearward of and engaging the rear end 36 of the slide block B. The spring means normally yieldingly urges the slide block forward in the lever arm, with limited or controlled predetermined force. The means S is shown as including an elongate helical compression spring in the lever A, with a front end seated on the rear end of the block B and a rear end stopped in the rear end of the lever A by manually operable adjusting means O. The means O is operable to vary axial biasing of the spring and to thereby vary the pressure which is applied to the block B and transmitted to and through the cam means M.

The manually operable spring adjusting means O that I provide and which is clearly illustrated in FIGS. 1 through 13 of the drawings includes an annular internally threaded plug 50 slidably engaged in and releasably secured in the lever A, in spaced relationship from the rear end of the spring S, an elongate axially shiftable adjusting screw 51 threaded in and through the plug 50 to project forwardly and rearwardly therefrom, concentric within the lever A. The screw 51 is shown in the form of an elongate threaded bolt with a head 52 at its forward end. The head 52 supports a hardened metal disc 53 slidably engaged in the lever A. The disc 53 is engaged by a rearwardly projecting teat 54 on a disc-like spring seat 55 slidably engaged in the lever A and stopped against the rear end of the spring S.

The plug 50 is slidably engaged in the lever A and is releasably secured in predetermined position therein by a pair of elongate radially extending pins 56 with radial inner end portions frictionally engaged in aligned openings 57 entering opposite sides of the plug and radial outer end portions which are frictionally engaged in and through radial openings 58 in the lever A. The outer end portions of the pins project radially outward from the plug 50 and the lever A, at the opposite sides thereof, as clearly shown in FIGS. 9 through 12 of the drawings.

It is to be noted that with the plug 50 and pins 56 that we provide, only the openings 58 need be drilled in the lever A and that the plug 50 can be engaged and pinned or set in the lever A during final assembly of the several finished parts of the wrench structure.

The rear end portion of the screw 51 projects freely longitudinally rearwardly from the open rear end of the lever A and carries a manually engageable operating knob structure 60 which can be manually engaged to rotate the screw to advance said screw axially forwardly and rearwardly in and through the plug and to thereby increase or decrease axial biasing of the spring S and to adjust the force which is applied onto and through the cam means M.

Referring to FIGS. 1 through 6 of the drawings, the knob structure 60 has an enlarged, substantially cylindrical, rear end portion with a central screw opening 61 in and through which the rear end portion of the screw is engaged. The knob structure is further characterized by a forwardly opening polygonal recess 62 concentric with the opening 60 and in which a set nut 63, on the screw 51, is seated. The knob next includes a rearwardly opening cylindrical cavity 64 with a flat, radially extending and rearwardly disposed bottom and in which the rear end portion of the screw freely projects. A lock nut 65 and a lock washer 66 are engaged on the rear end portion of the screw and advanced into tight engagement with the bottom of the cavity 64 to cooperate with the set nut 63 to releasably clamp the knob structure in desired axial set position on the screw and in rotary driving engagement therewith. The nut 65 and washer 66 are accessible through the open rear end of the cavity 64.

The knob structure 60 next includes a radially inwardly and axially rearwardly opening annular seat 67 about the open rear end of the recess 64 and in which a disc-like closure 68 is releasably engaged to normally obscure and protect the screw, nut and washer assembly within the construction. The knob structure 60 next includes a forwardly opening inner annular recess 69 about the portion of the knob structure in which the cavity 62 is formed and into which the rear end portion of the lever A can slidably enter, when the screw is advanced to its forwardmost limits, upon adjusting and setting the wrench.

The knob structure 60 next includes and/or carries an elongate axially extending calibrated sleeve 70. The sleeve 70 projects axially forwardly from the rear portion of the knob structure and slidably engages about or slidably receives the rear end portion of the lever A. The sleeve 70 rotates and shifts longitudinally about and relative to the rear end portion of the lever A upon rotation and longitudinal shifting of the screw 51 relative to the lever A.

The central portion of the exterior of the sleeve 70 is provided with and/or carries a longitudinally extending radially outwardly disposed scale 71 calibrated to indicate the operating force of the wrench when the screw 51 is in different longitudinal set positions relative to the lever A.

In the form of the invention illustrated, the scale 71 is printed durable metallic sheet 72 fixed on and about the sleeve 70 by means of a pressure adhesive. The exterior of the sleeve is preferably suitably relieved to accommodate and accurately position the sheet 72 and to overlie and protect the edges of the sheet so that the edges of the sheet are unlikely to be caught or snagged on some foreign object and displaced or damaged thereby.

The forward end portion of the sleeve 70 is externally splined. That is, the forward end of the sleeve is formed with a plurality (10) of circumferentially spaced, axially and radially outwardly opening, longitudinally extending indexing grooves 73.

Finally, the knob structure is formed with an elongate forwardly opening outer annular recess 74 spaced radially outward of and at the rear end of the sleeve 70. The recess 74 is provided to normally receive a part of a hand-grip G, which will hereinafter be described.

Figure 5:
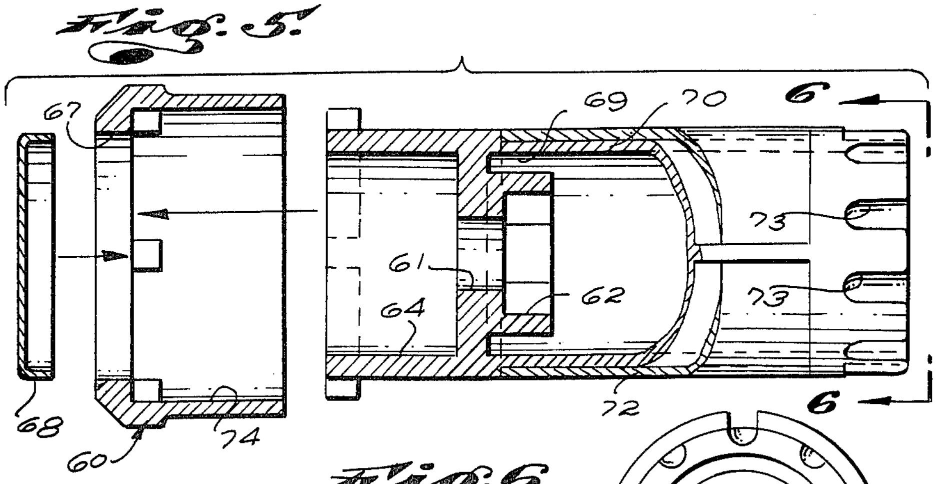
FIG. 5 is an enlarged exploded view of parts of the structure shown in FIG. 3.
Figure 6:
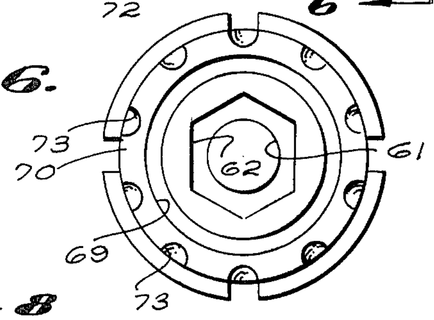
FIG. 6 is a view taken as indicated by line 6—6 in FIG. 5.
Figure 7:
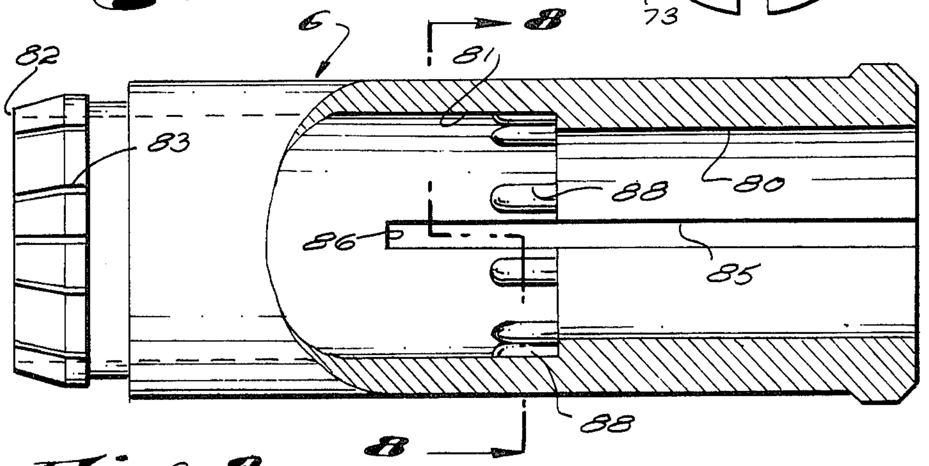
FIG. 7 is an enlarged view of another part of the structure shown in FIG. 3.
Figure 8:
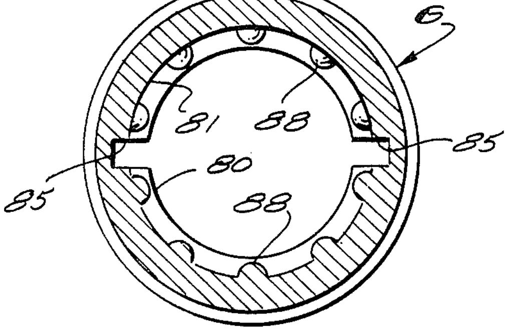
FIG. 8 is a view taken as indicated by line 8—8 in FIG. 7.
Figure 9:
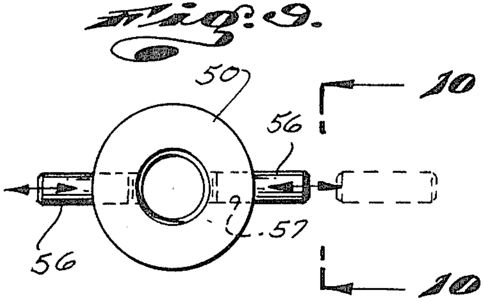
FIG. 9 is an enlarged view of still other parts of the structure shown in FIG. 3.
Figure 10:
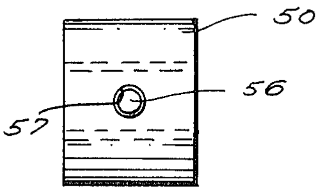
FIG. 10 is a view taken as indicated by line 10—10 in FIG. 9.
Figure 11:
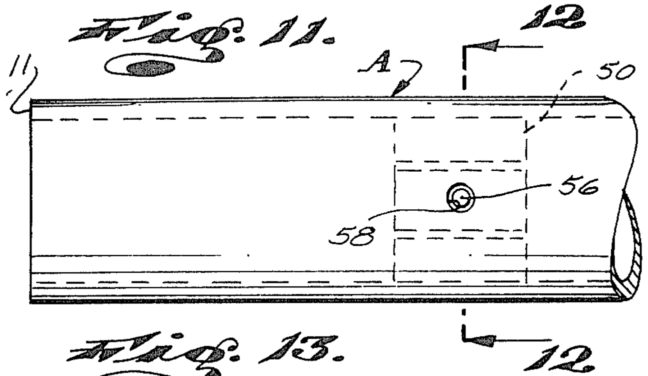
FIG. 11 is an enlarged view of a portion of the strucure shown in FIG. 3.
Figure 12:
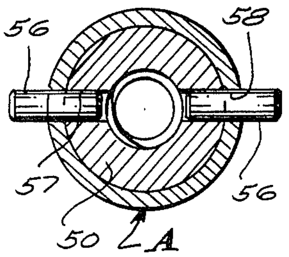
FIG. 12 is a sectional view taken as indicated by line 12—12 in FIG. 11.
Figure 13:
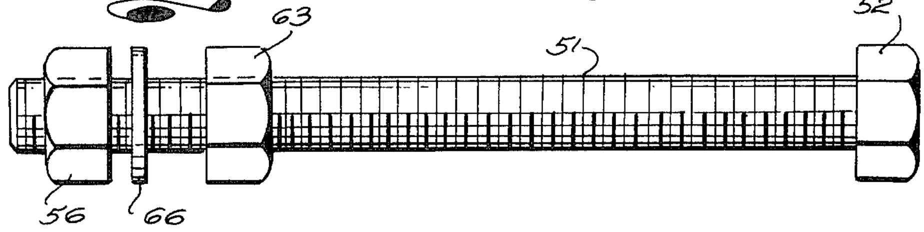
FIG. 13 is an enlarged elevational view of the nut, washer and bolt assembly of the structure shown in FIG. 3.

In practice, and as shown in FIG. 5 of the drawings, the knob structure 60, with its several distinct parts and/or features can be and is preferably composed of three parts which can be easily and economically die-cast of metal or molded of plastic and which can be easily, quickly and economically assembled to establish a substantially integrated unit.

The wrench structure that we provide next and finally includes a manually engageable hand-grip G normally engaged about the rear end portion of the lever A and about the sleeve 70 of the knob structure 60. The grip G is shiftable axially forwardly relative to the lever A and the knob structure from its normal position where its rear portion occurs about the sleeve 70 to an actuated position where its rear portion is moved from engagement about the sleeve 70.

The grip G is an elongate tubular part with front and rear end portions. The front end portion has a central cylindrical opening 80 substantially equal in diametric extent with the outside diameter of the lever A and slidably engaged about and shiftable axially relative to the rear end portion of the lever. The rear end portion of the grip G has an enlarged outer cylindrical opening 81 substantially equal in diametric extent with the outside diameter of the sleeve 70 and is normally slidably engaged about the sleeve 70. The rear end portion of the grip is formed so that when the grip is in its normal rear position, it frictionally slidably enters the outer annular recess 74 of the knob structure 60, as clearly shown in FIGS. 1 and 3 of the drawings. The terminal rear end portion of the grip defines an annular reference edge or line 82 which cooperates with the scale 71 on the sleeve 70 when the grip is in its forward or actuated position. The edge 82 cooperates with the scale 71 to accurately indicate the longitudinal position of the screw 51 relative to the lever A. In practice, and as shown in the drawings, the outer end portion of the grip is formed with one or a plurality of circumferentially spaced reference lines or calibrations 83 which cooperate with the scale 71 to accurately indicate the relative rotative position of the screw relative to the lever and to indicate that operating force at which the wrench is set when the screw is at the longitudinal and rotative position indicated by the related scale 71, edge 82 and the calibration or calibrations 83.

In the case illustrated, the rear end portion of the grip defining the indicating edge 82, which is provided with the calibration or calibrations 83 and which normally occurs in the recess 74 of the knob structure 60, is of reduced outside diameter so that the exterior of the grip, axially forward of the knob is flush with the exterior of the knob when the grip is in its normal rear position and the exterior of the knob and grip abut. With such a relationship of parts, the knobs and sleeve normally appear and feel like a single unitary part. As shown, the reduced rear end portion of the grip is suitably tapered to define a relatively sharp clean edge 82 and to dispose the calibrations 83 for most effective relating of the edge 82 and calibrations with the scale 71.

In addition to the foregoing, the grip is provided with a pair of elongate, longitudinally extending, axially outwardly and radially inwardly opening guideways or grooves 85 in which the outer ends of the pins (provided to position the plug 50 in the lever A) are slidably engaged. The pins 56 hold or lock the grip against rotation and allow for free axial shifting of the grip G relative to the lever A. Further, the grooves 85 extend a predetermined distance longitudinally inward from the forward end of the grip and terminate therein to define stop shoulders 86 which engage the pins 56 when the grip is moved axially outwardly from its normal position to its forward or actuated position. Thus, when the grip G is moved to said forward or actuated position, the edge 82 thereon is stopped at a predetermined operating position relative to the lever and to the scale 71 on the knob structure 60.

Finally, the grip is internally splined at the forward end of the opening 81 in its rear position. That is, it is formed with a plurality (10) of circumferentially spaced, radially inwardly projecting longitudinally extending ribs 88 which are normally engaged in and with the grooves 73 in the forward outer end of the sleeve 70 of the knob structure 60 and which serve to normally releasably lock the knob and grip together against relative rotation in any one of ten relative rotative positions. With the interengaged splines or grooves and ribs 73 and 88 and with the pins 56 engaged in the grooves 85, as noted above, and as clearly shown in the drawings, it will be apparent that when the wrench is set to operate, with its head H engaged with a related piece of work and its grip G manually engaged to apply torsional force to the work, the grip is held against rotation relative to the lever and the knob structure is releasably locked against rotation relative to the grip and lever. Thus, undesirable rotation of the grip relative to the lever is eliminated and inadvertent rotation of the knob structure 60 and altering the set of the wrench, when the knob is gripped (with the handle), is prevented.

It is most significant and important to note that but for the drilling, the two pairs of aligned openings 19 and 58 in the front and rear portions of the lever A, no costly machine and/or forming operations need be performed on the lever and that the lever is essentially a clean, unobstructed open-ended tubular metal part of limited longitudinal extent which can be easily, effectively and economically cleaned, heat treated, plated and otherwise finished so that it is straight and undistorted; is evenly heat treated throughout its entire extent; and its interior is free of scale, rust and is dry and free of residues of solutions, solvents and the like which might result in oxidation, fouling and otherwise adversely affecting the wrench, after its manufacture is complete.

In considering the desirability or necessity of establishing and maintaining the interior of the lever A clean, dry and free of scale, rust and materials or substances that might foul or cause the interior surface of the lever to become fouled, it is to be noted that the slide block B and discs 54 and 55 are guided by the lever and must freely shift and move longitudinally therein. The presence of scale, rust and foreign materials that might tend to continuously or intermittently interfere with the free movement of any one or more of the above noted parts must be avoided, since slight interference of movement of those parts will adversely affect the accuracy of the wrench and render it unreliable.

In addition to the above, during normal operation of the wrench, the crank C strikes the interior of the lever and the spring S frequently engage and strike the interior of the lever. If the interior of the lever carries scale, rust or other contaminating materials, the crank and/or the spring, in addition to the block D and the discs 54 and 55, are likely to knock the scale, rust and contaminates free from the interior surface of the lever. Such loose material, if allowed to remain, not only tends to foul and prevent free movement of the noted block and disc within the lever, but tends to foul the cam means and the pinned connection between the lever arm 12 and the lever A. Thus, the establishment and maintenance of a clean interior in the lever is highly important and cannot be over-emphasized.

With the construction that we provide, no structure exists which does not allow for maintaining the interior of the lever clean. Should the wrench that we provide become dirty or fouled during its normal use, it can be easily and quickly disassembled and cleaned. During disassembly, the plug 50 can be removed from the lever by pulling the pins 56, thus leaving the opening through the lever totally unobstructed and such that it can be effectively cleaned as by simply forcing clean wadding or the like through it by means of a suitable shaft or rod.

When comparing the manually operable spring pressure adjusting means O of our present invention with the comparable means O in the structure disclosed in the above identified U.S. Pat. No. 3,772,942, the cost of the several parts making up that means in the present invention are notably less than the cost of the parts of the present wrench are more easily and quickly assembled and disassembled than are similar parts in the noted patented wrench. Finally, the means O of the present invention, while requiring the drilling of the openings 58 in the lever A, does not require the costly machining and forming operations required to be performed in the lever of the noted patented wrench. As a result of the foregoing, it has been determined that the cost of manufacture of the means O of the present invention is notably less than the cost of manufacturing a comparable wrench with manual operating means such as the means O in the noted patented wrench.

Having described only typical preferred forms and carrying out of our invention, we do not wish to be limited to the specific details herein set forth but wish to reserve to ourselves any modifications and/or variations that might appear to those skilled in the art and which fall within the scope of the following claims:

Having described our invention, we claim:

1. A torque wrench comprising an elongate, straight tubular lever with open front and rear ends, a work-engaging head at the front end of the lever and having a lever arm projecting into and pivotally connected with the front end portion of the lever, an elongate crank normally concentric with and projecting freely rearwardly into the lever, an elongate axially biased compression spring with front and rear ends extending longitudinally in the lever rearward of the crank, cam means between the front end of the spring and the crank normally releasably holding the crank concentric in the lever and operating to allow the crank to pivot and strike a side of the lever when a predetermined set operating force is exerted between the head and the lever through and about the axis of the lever arm; and manually operable means to vary the bias on said spring to adjust the set operating force and including a plug set in the lever rearward of the spring, an elongate screw with front and rear ends concentric with the lever and threadedly engaged through the plug, means at the front end of the screw engaging the rear end of the spring, a manually engageable knob drivingly coupled to the rear end portion of the screw and spaced rearward from the lever, said knob has an elongate sleeve projecting forwardly therefrom and slidably engaged about the rear end portion of the lever and has an enlarged rear end portion with a forwardly opening annular recess at and about the rear end of the sleeve, said sleeve is provided with a longitudinal calibration and a series of longitudinally spaced circumferential calibrations, an elongate tubular hand grip with a front portion slidably engaged about the rear portion of the lever and a rear portion slidably engaged about the sleeve and normally entered into said annular recess, said rear end of the grip defines a rearwardly disposed annular reference edge to cooperate with said series of calibrations when the grip is shifted axially forward to a predetermined actuated position, the rear end of the grip has a plurality of circumferentially spaced calibrations shiftable into and out of register with said longitudinal calibrations when the grip is in its actuated position, stop means stopping rotation of the grip relative to the lever and stopping axial forward movement of the grip relative to the lever at said predetermined actuated position, and indexing means releasably locking the knob in set rotative position relative to the grip when the grip is in its normal position.

2. The torque wrench set forth in claim 1 wherein the plug is slidably engaged in the lever and is set in position therein by a radially extending pin engaged in and through registering radial openings in the plug and the lever.

3. The torque wrench set forth in claim 2 wherein said stop means includes an elongate longitudinally extending radially inwardly opening groove in the front portion of the grip, the rear end of the grooves defines a stop shoulder, said pin setting the plug in the lever projects from the lever into said groove and is engageable with said shoulder.

4. The torque wrench set forth in claim wherein said stop means includes an elongate longitudinally extending radially inwardly opening groove in the front portion of the grip, the rear end of the groove defines a stop shoulder and a radially outwardly projecting pin on the lever is engaged in the groove and is engageable with said shoulder.

5. The torque wrench set forth in claim 1 wherein the indexing means includes a plurality of elongate, axially extending circumferentially spaced forwardly and radially outwardly opening grooves in the front end of the sleeve and a plurality of elongate, axially extending circumferentially spaced radially inwardly projecting ribs in the grip engaged in the indexing grooves when the grip is in its normal position and disengaged and spaced forward from said indexing grooves when the grip is in its actuated position.

6. The torque wrench set forth in claim 2 wherein the indexing means includes a plurality of elongate, axially extending circumferentially spaced forwardly and radially outwardly opening grooves in the front end of the sleeve and a plurality of elongate, axially extending circumferentially spaced radially inwardly projecting ribs in the grip engaged in the indexing grooves when the grip is in its normal position and disengaged and spaced forward from said indexing grooves when the grip is in its actuated position.

7. The torque wrench set forth in claim 3 wherein the indexing means includes a plurality of elongate, axially extending circumferentially spaced forwardly and radially outwardly opening grooves in the front end of the sleeve and a plurality of elongate, axially extending circumferentially spaced radially inwardly projecting ribs in the grip engaged in the indexing grooves when the grip is in its normal position and disengaged and spaced forward from said indexing grooves when the grip is in its actuated position.

8. The torque wrench set forth in claim 4 wherein the indexing means includes a plurality of elongate, axially extending circumferentially spaced forwardly and radially outwardly opening grooves in the front end of the sleeve and a plurality of elongate, axially extending circumferentially spaced radially inwardly projecting ribs in the grip engaged in the indexing grooves when the grip is in its normal position and disengaged and spaced forward from said indexing grooves when the grip is in its actuated position.

9. The torque wrench structure set forth in claim 1 wherein the knob includes a part with a central opening through which the rear portion of the screw projects a stop nut on the screw engaged with the front of said part, a lock nut on said screw engaged with the rear of said part, said nuts are shiftable axially of the screw and into and out of engagement with said part whereby the longitudinal position of the knob relative to the screw can be adjusted.

10. The torque wrench structure set forth in claim 2 wherein the knob includes a part with a central opening through which the rear portion of the screw projects, a stop nut on the screw engaged with the front of said part, a lock nut on said screw engaged with the rear of said part, said nuts are shiftable axially of the screw and into and out of engagement with said part whereby the longitudinal position of the knob relative to the screw can be adjusted.

11. The torque wrench structure set forth in claim 3 wherein the knob includes a part with a central opening through which the rear portion of the screw projects, a stop nut on the screw engaged with the front of said part, a lock nut on said screw engaged with the rear of said part, said nuts are shiftable axially of the screw and into and out of engagement with said part whereby the longitudinal position of the knob relative to the screw can be adjusted.

12. The torque wrench structure set forth in claim 4 wherein the knob includes a part with a central opening through which the rear portion of the screw projects, a stop nut on the screw engaged with the front of said part, a lock nut on said screw engaged with the rear of said part, said nuts are shiftable axially of the screw and into and out of engagement with said part whereby the longitudinal position of the knob relative to the screw can be adjusted.

13. The torque wrench structure set forth in claim 5 wherein the knob includes a part with a central opening through which the rear portion of the screw projects, a stop nut on the screw engaged with the front of said part, a lock nut on said screw engaged with the rear of said part, said nuts are shiftable axially of the screw and into and out of engagement with said part whereby the longitudinal position of the knob relative to the screw can be adjusted.

14. The torque wrench structure set forth in claim 6 wherein the knob includes a part with a central opening through which the rear portion of the screw projects, a stop nut on the screw engaged with the front of said part, a lock nut on said screw engaged with the rear of said part, said nuts are shiftable axially of the screw and into and out of engagement with said part whereby the longitudinal position of the knob relative to the screw can be adjusted.

15. The torque wrench structure set forth in claim 7 wherein the knob includes a part with a central opening through which the rear portion of the screw projects, a stop nut on the screw engaged with the front of said part, a lock nut on said screw engaged with the rear of said part, said nuts are shiftable axially of the screw and into and out of engagement with said part whereby the longitudinal position of the knob relative to the screw can be adjusted.

16. The torque wrench structure set forth in claim 8 wherein the knob includes a part with a central opening through which the rear portion of the screw projects, a stop nut on the screw engaged with the front of said part, a lock nut on said screw engaged with the rear of said part, said nuts are shiftable axially of the screw and into and out of engagement with said part whereby the longitudinal position of the knob relative to the screw can be adjusted.

* * * * *